United States Patent
Uchida et al.

[19]

[11] Patent Number: 6,137,548
[45] Date of Patent: *Oct. 24, 2000

[54] MOUNTING STRUCTURE OF PROTECTING PANEL FOR AN IMAGE DEVICE AND MOUNTING METHOD THEREOF

[75] Inventors: Keiji Uchida, Hirakata; Kaoru Shimizu, Osaka, both of Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/098,890

[22] Filed: Jun. 17, 1998

[30] Foreign Application Priority Data

Jul. 3, 1997 [JP] Japan .................................. 9-177966

[51] Int. Cl.$^7$ ....................................................... H04N 5/65
[52] U.S. Cl. ........................... 348/818; 348/823; 348/826
[58] Field of Search .................................... 348/818, 836, 348/839, 789, 826, 825, 823, 842, 744, 834, 824; 353/47, 72, 74, 71; 359/443, 450; 312/7.2, 10.1

[56] References Cited

U.S. PATENT DOCUMENTS

| | | | |
|---|---|---|---|
| 4,550,344 | 10/1985 | Buckley | 348/826 |
| 4,992,881 | 2/1991 | Tomasek et al. | 348/818 |
| 5,347,367 | 9/1994 | Swank et al. | 348/823 |
| 5,548,350 | 8/1996 | Yamada et al. | 348/839 |
| 5,592,241 | 1/1997 | Kita et al. | 348/823 |
| 5,627,606 | 5/1997 | Pember et al. | 348/818 |

FOREIGN PATENT DOCUMENTS

8-9297  1/1996  Japan .

*Primary Examiner*—Chris S. Kelley
*Assistant Examiner*—Gims Philippe
*Attorney, Agent, or Firm*—Ratner & Prestia

[57] ABSTRACT

A mounting structure for a display device which includes a frame on which a screen is held includes a protecting panel disposed at the front side of the screen, a substantially Z-form holding member having a holding portion for holding the peripheral edge of the protecting panel, and a pressing portion pressed in the gap formed between the frame and the screen. The screen is placed at the back side of the frame, the protecting panel is placed at the inner side of the opening of the frame, a part of the holding portion of the holding member is positioned between the opening of the frame and the peripheral part of the protecting panel. By the pressing portion of the holding member, the screen and the holding member are held on the frame, and by the holding portion of the holding member, the protecting panel is held on the frame.

41 Claims, 6 Drawing Sheets

MOUNTING STRUCTURE OF PROTECTING PANEL FOR AN IMAGE DEVICE AND MOUNTING METHOD THEREOF

TECHNICAL FIELD OF THE INVENTION

The present invention relates to a mounting structure of a protecting panel for protecting the display surface of a projection type television receiver or the like, and a mounting method thereof.

BACKGROUND OF THE INVENTION

Recently, users often mount, after purchasing projection type television receivers, a protecting panel on the front surface of a screen for the purpose of prevention of scratches of the screen surface or prevention of dust deposits.

FIG. 5 shows an example of a mounting structure of a protecting panel in a prior art. In FIG. 5, a frame 52 is provided for holding the screen at the front side of a television receiver 50. A protecting panel 51 has overall dimensions nearly same as the overall dimensions of the frame 52. The protecting panel 51 is held on the frame 52 as being adhered to the front surface 53 of the frame 52 through both-side adhesive tapes 52 adhered at four corners of the back side periphery.

A mounting example of a protecting panel in other prior art is shown in FIG. 6. In FIG. 6, a frame 62 is provided for holding the screen at the front side of a television receiver 60. A second fastener member 63b planting multiple loop bristles is adhered to the front surface 63 of the frame 62, and a first fastener member 63a having an entangled protrusion of loop bristles at the end is adhered to the back side of a protecting panel 61, and by mutually pressing and bonding the first fastener member 63a and second fastener member 63b, the protecting panel 61 is held on the frame 62.

Moreover, Japanese Laid-open Patent No. 8-9297 proposes a constitution in which the upper portion of a protecting panel is inserted into a gap between a frame for holding the screen and the upper side of the screen, and the lower portion of the protecting panel is fitted in a gap between the frame and the lower portion of the screen and inserted into an L-form portion of a holding member.

In the prior arts, however, when the both-side adhesive tapes 52, or fastener members 63a, 63b are adhered to the protecting panels 51,61 or frames 52, 62, sufficient caution is needed so that the both-side adhesive tapes 52, or fastener members 63a, 63b may not be dislocated from the protecting panels or screen holding frames, and the number of working processes is increased. Besides, the protecting panels are made of light permeable members such as acrylic resins, and the adhered both-side adhesive tapes and fastener members are seen through, and the appearance is spoiled. Or, if the protecting panels once mounted are dismounted, parts of the both-side adhesive tapes or fastener members are left over on the frames, which also spoils the appearance.

In Japanese Laid-open Patent No. 8-9297, yet, although the upper portion and lower portion of the protecting panel are held on the frame, but are not securely pressed to the screen. Besides, the right and left sides of the protecting panel are not held but are free, and hence it is hard to adhere the protecting panel and the screen.

The invention provides a mounting structure and a mounting method, being easy to mount and dismount a protecting panel and free from adverse effects on the appearance.

SUMMARY OF THE INVENTION

A mounting structure of protecting panel for an image device of the invention comprises (a) a frame forming an opening, (b) a screen held on the frame, (c) a protecting panel disposed at the front side of the screen, and (d) a holding member having a holding portion for holding the peripheral edge of the protecting panel, and a pressing portion being pressed into a gap formed between the frame and the screen.

A method of mounting a protecting panel on an image device of the invention comprises the steps of (a) placing a screen on a frame having an opening, (b) pressing a first pressing portion of a first holding member into a first gap formed between the frame and the front side of a lower part of the screen, (c) fitting the lower part of a protecting panel on a first holding portion of the first holding member, and (d) pressing a second pressing portion of a second holding member into a second gap formed between the frame and the front side of an upper part of the screen, and fitting the upper part of the protecting panel to a second holding portion of the second holding member.

Another method of mounting a protecting panel on an image device of the invention comprises the steps of (a) placing a screen on a frame having an opening, (b) pressing a first pressing portion of a first holding member into a first gap formed between the frame and the front side of a lower part of the screen, (c) pressing a second pressing portion of a second holding member into a second gap formed between the frame and the front side of an upper part of the screen, and (d) placing a protecting panel while deflecting in an arc form between a first holding portion of the first holding member pressed into the first gap and a second holding portion of the second holding member pressed into the second gap, returning the protecting panel from the arc form to an original shape, holding the lower part of the protecting panel by the first holding portion of the first holding member, and holding the upper part of the protecting panel by the second holding portion of the second holding member Preferably, the screen and holding member are held on the frame by the pressing portion of the holding member, and the protecting panel is held on the frame by the holding portion of the holding member.

Preferably, the screen is placed at the back side of the frame, the protecting panel is placed at the inner side of the opening of the frame, and a part of the holding portion of the holding member is positioned between the opening of the frame and the peripheral part of the protecting panel.

In this constitution, the holding member can be easily inserted between the frame and the screen, and at the same time the protecting panel can be easily placed at the front side of the screen. As a result, mounting of the protecting panel is easy. Moreover, the protecting panel can be easily dismounted from the front side of the screen. As a result, dismounting of the protecting panel is easy. Further, spoiling of the appearance of the receiver is eliminated.

DETAILED DESCRIPTION OF THE INVENTION

A mounting structure of protecting panel for an image device of the invention is characterized by: holding the peripheral edge of the protecting panel disposed closely to the front side of a screen, a holding member lightly pressed into a gap between a frame for holding the screen, and the screen itself. In this constitution, it is easy to mount and dismount the screen, and the appearance is not spoiled.

Preferably, the screen holding frame and holding member are composed of the same material or the same (or similar, or even a complimentary) color. In this constitution, the presence of the holding member is not bothersome, and the appearance is not spoiled.

Preferably, the holding member is made of light permeable material. In this constitution, the user (typically) hardly notices the presence of the holding member, and there is little effect on the appearance.

A mounting method of a protecting panel on an image device in an exemplary embodiment of the present invention is characterized by pressing lightly a first holding member into a gap between a frame for holding a screen and the lower part of the screen, inserting the lower part of a protecting panel into an L-form part of the first holding member, pressing lightly a second holding member into a gap between the frame and the upper part of the screen, and holding the protecting panel. In this method, the protecting panel can be mounted easily, and the number of job steps is smaller.

Another mounting method of a protecting panel in an exemplary embodiment of the present invention is characterized by pressing lightly a first holding member and a second holding member into gaps between a frame for holding a screen, and the upper part of the screen and the lower part of the frame, and inserting a protecting panel between the two holding members by deflecting in an arc form. In this constitution, the protecting panel can be mounted easily, and the number of job steps is smaller.

An embodiment of the invention is specifically described below while referring to FIG. 1 through FIG. 4.

Embodiment 1

Figure 1:
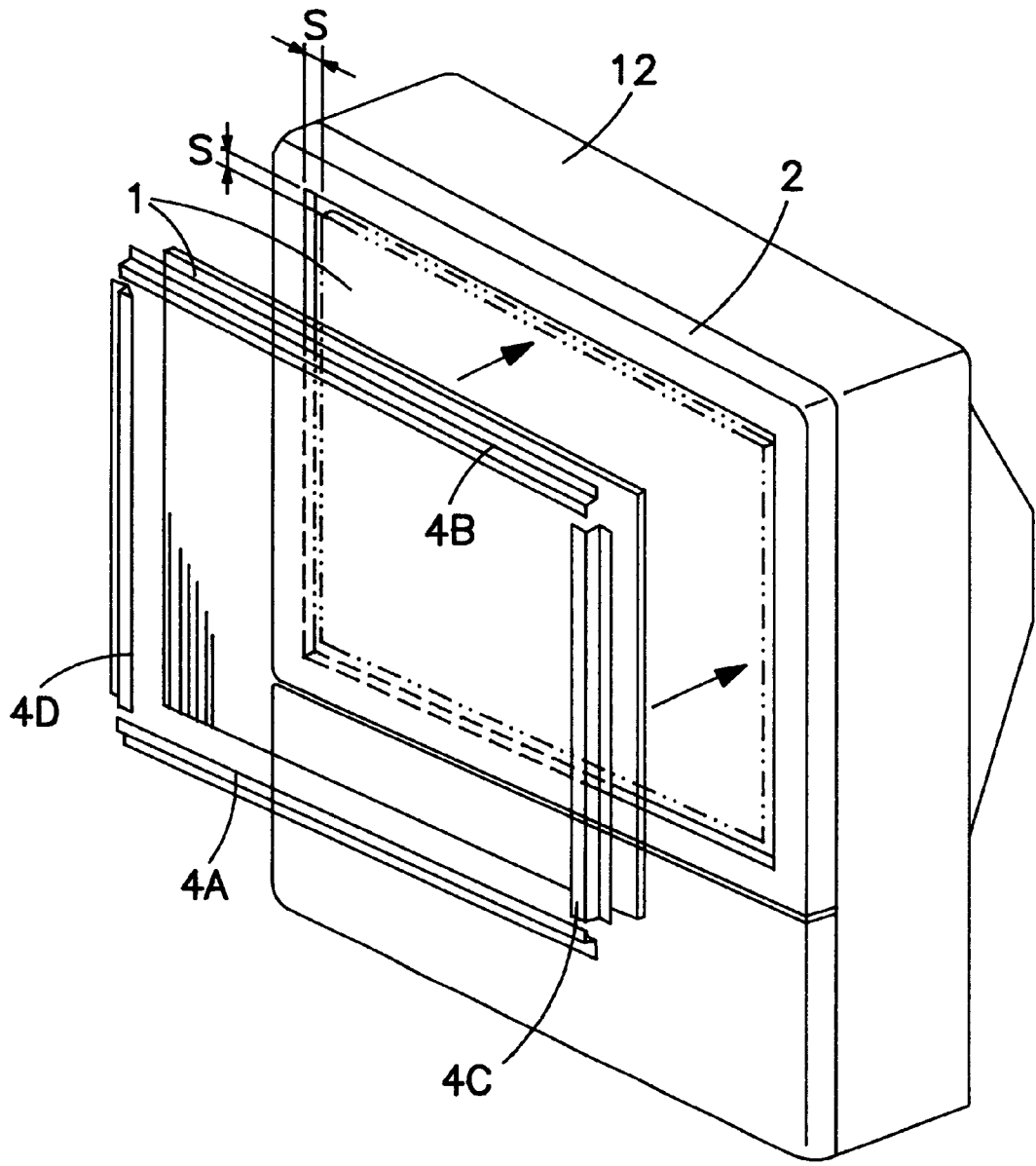
FIG. 1 is a perspective view, before mounting of the protecting panel, of an exemplary embodiment of the invention.
Figure 2:
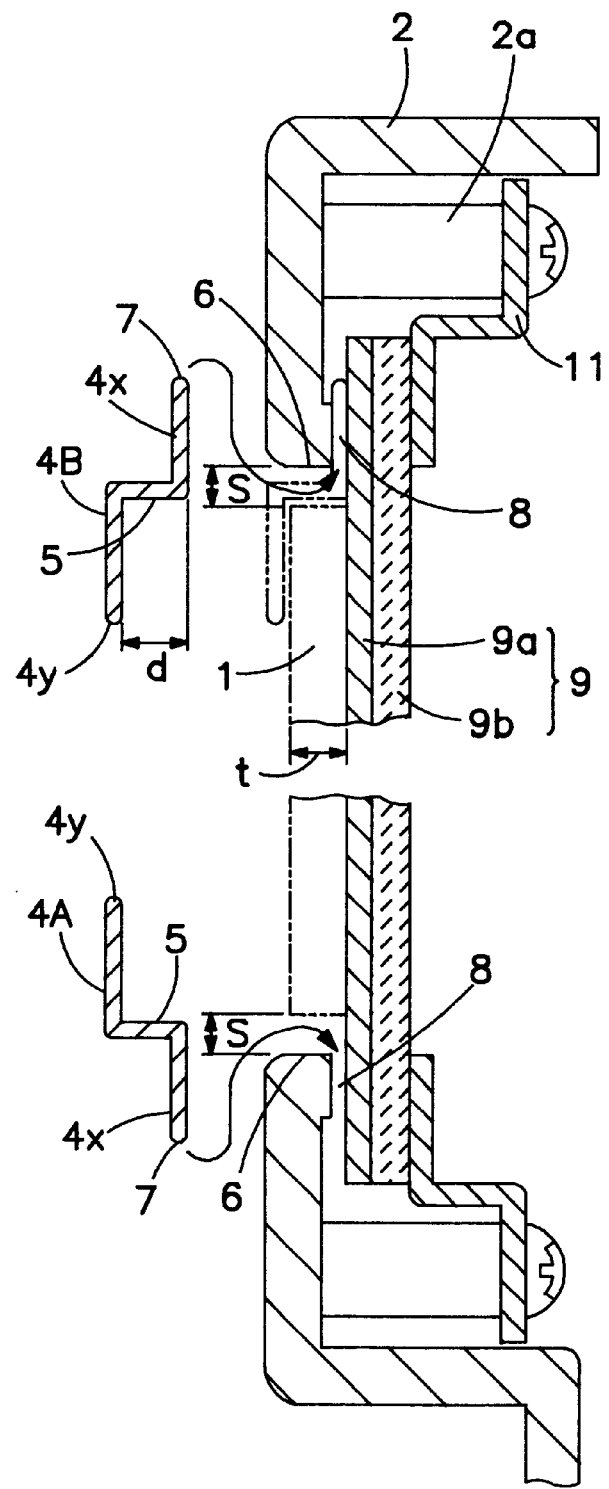
FIG. 2 is a longitudinal sectional view of portions of the receiver and protecting panel shown in FIG. 1.
Figure 3:
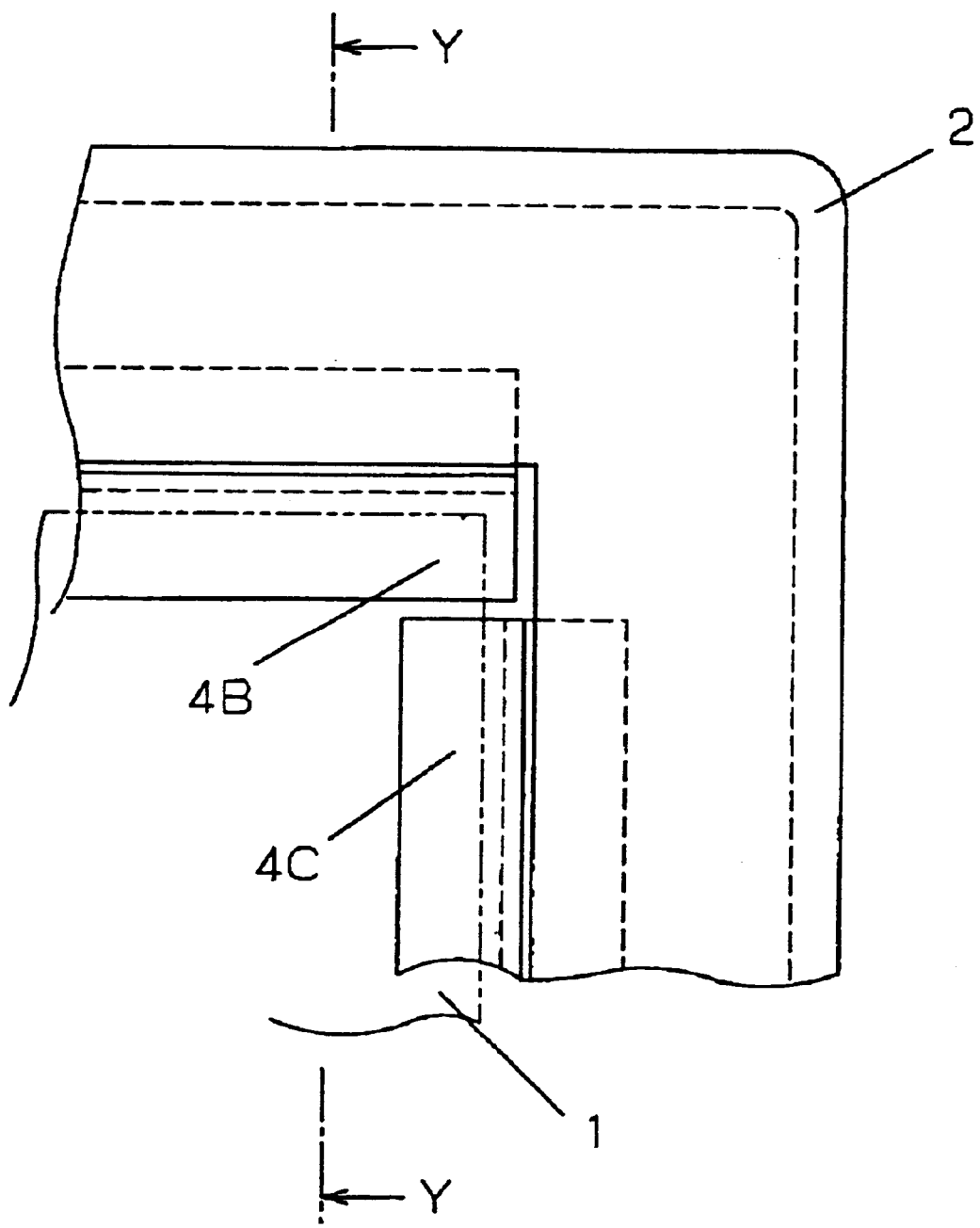
FIG. 3 is a front view of portions of the protecting panel after it has been mounted to the receiver.
Figure 4:
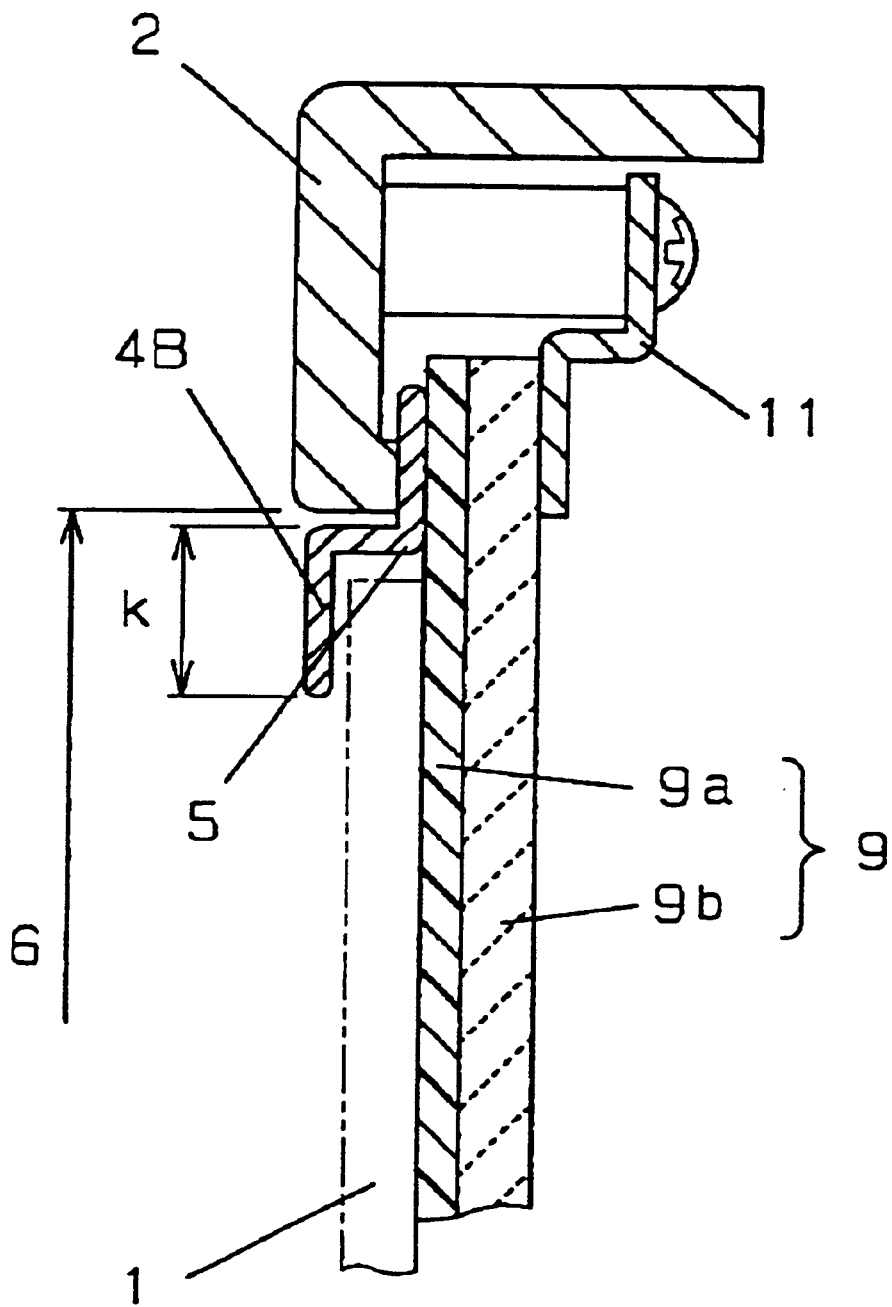
FIG. 4 is a sectional view of essential parts cut along cut-off line 4—4 in FIG. 3.
Figure 5:
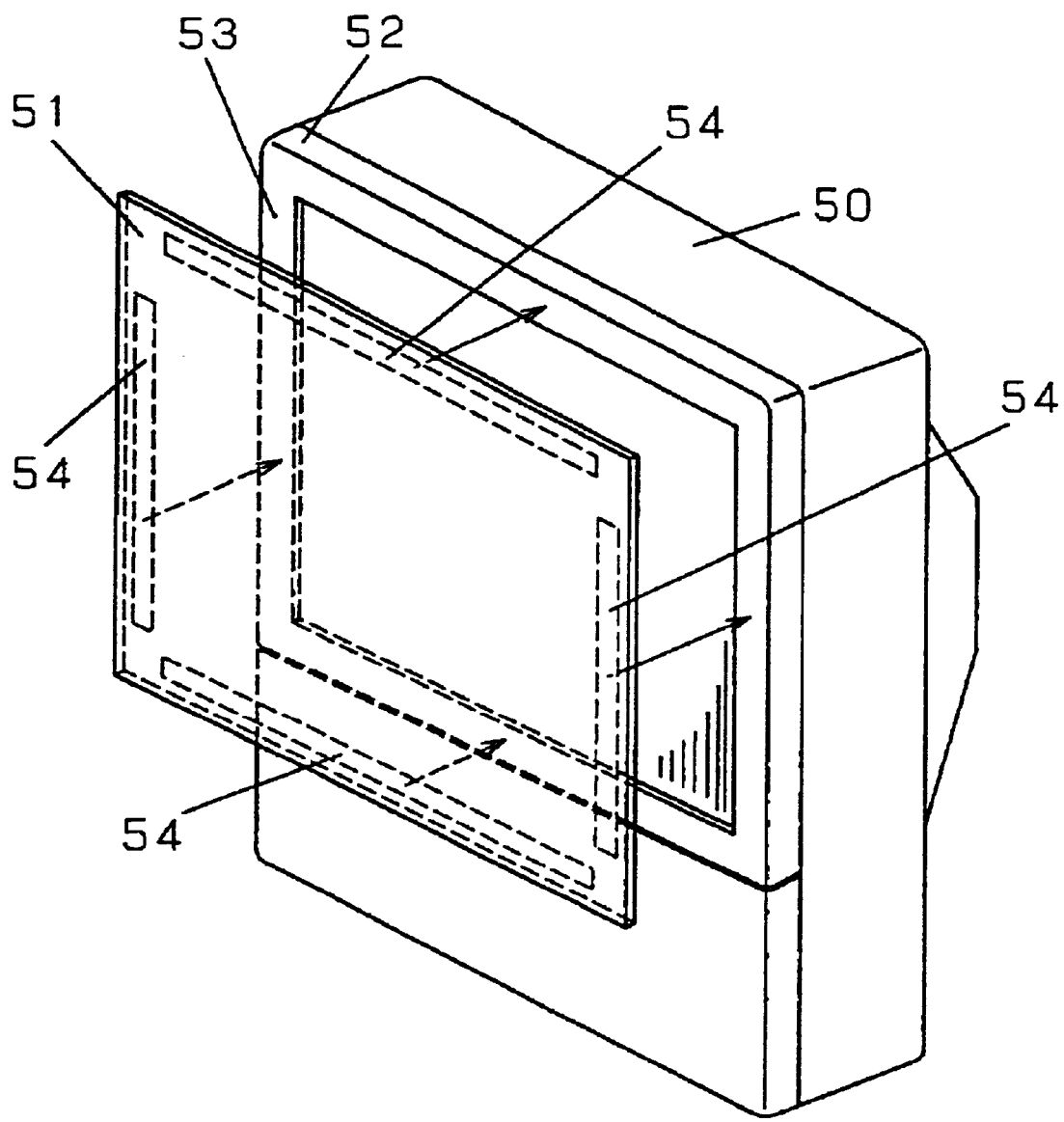
FIG. 5 is a perspective view of a protecting panel mounting structure in accordance with the prior art.
Figure 6:
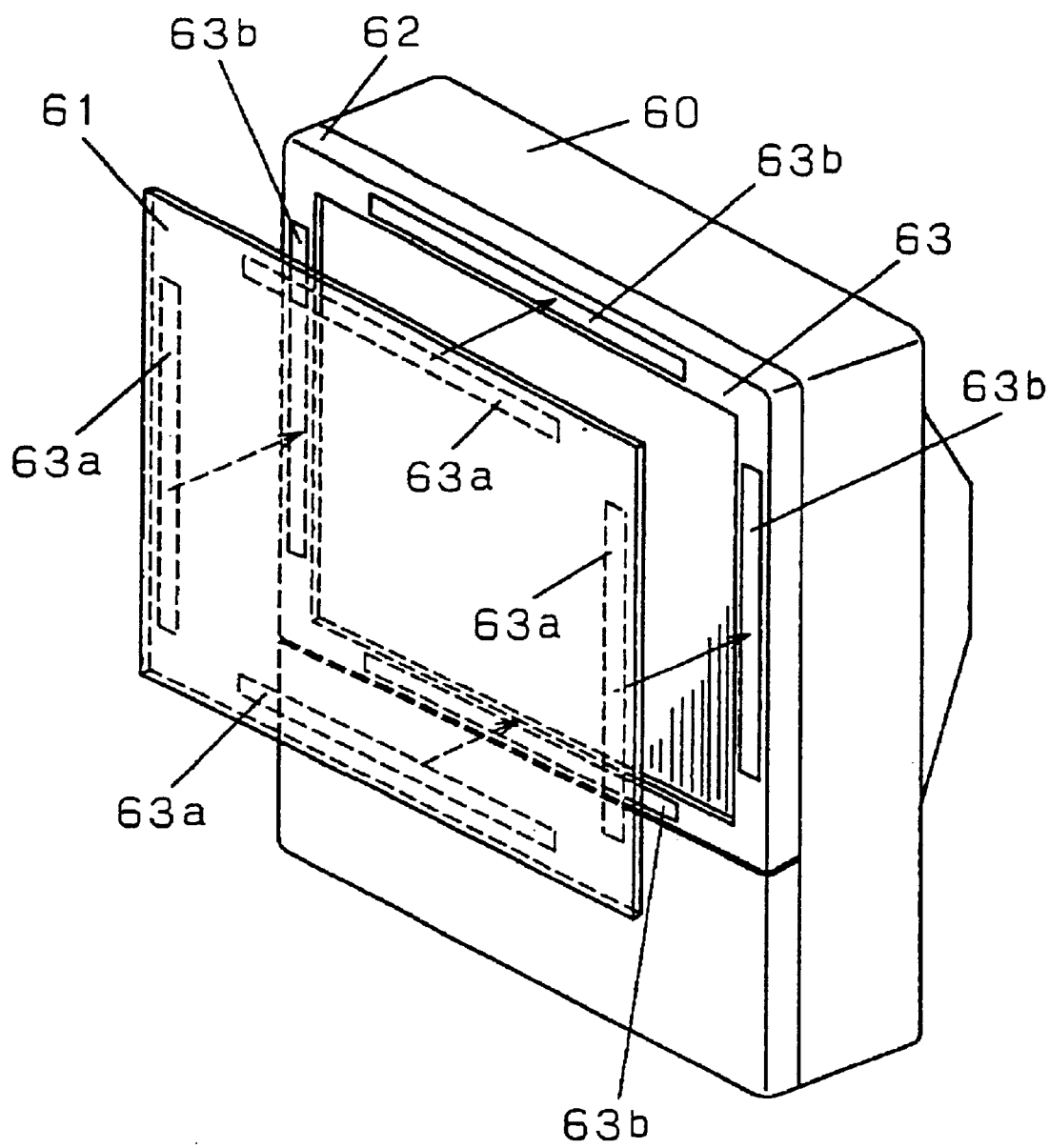
FIG. 6 is a perspective view of a further protecting panel mounting structure in accordance with the prior art.

FIG. 1 is a perspective view of a mounting structure of a protecting panel for an image device in an exemplary embodiment of the invention, showing the state before mounting of the protecting panel. FIG. 2 is a longitudinal sectional view of essential parts in FIG. 1, FIG. 3 is a front view of essential parts in the state after mounting of the protecting panel, and FIG. 4 is a sectional view of essential parts being cut off along cut-off line 4—4 in FIG. 3. In FIG. 1 and FIG. 2, a protecting panel 1 is placed at the front side of a television receiver 12. The television receiver 12 comprises a screen 9, and a frame 2 for holding this screen 9. The shape of the screen 9 is nearly square.

The frame 2 is, in its front view, nearly square having an opening cutting open a nearly square effective screen portion. The screen 9 has a lenticular lens sheet 9a and a Fresnel lens sheet 9b. The screen 9 has a wider outer diameter than the opening of the frame 2, and is disposed at the back side of the frame 2, and is tightened to a boss 2a provided in the frame 2 and fixed to the frame 2 by using a bracket 11. The bracket 11 is in a Z-form, and a half of one side of this bracket 11 is fixed to the boss 2q by pressing the screen 9 from the back side of the screen 9 so that a gap 9 may be formed between the back side of the frame 2 and the front side of the screen 9. The gap 8 is formed in order to insert a holding member described below in a lightly pressed state. The overall dimensions of the protecting panel 1 are smaller than the dimensions of the effective screen 6 defined by the frame 2 by a specified amount.

The protecting panel 1 is placed at the opening of the frame 2 to cover the front surface of the screen 9. At this time, a gap S is formed between the periphery of the protecting panel 1 and the inner circumference of the frame 2. Through the peripheral edge of the protecting panel 1 disposed closely to the front side of the screen 9, a pressing portion 4x in a first half region of the holding member 4 is lightly pressed in the gap 8 between the frame 2 and the screen 9, and the back side of a holding portion 4y in other second half region of the holding member 4 presses the periphery of the protecting panel 1. In this way, four peripheral sides (upper part, lower, and both sides) of the protecting panel 1 are held on the screen 9 by the holding member 4, and the screen 9 is held on the frame 2 by the pressing force by pressing of the holding member 4.

The holding member 4 includes a first holding member 4A disposed in the lower part, a second holding member 4B disposed in the upper part, a third holding member 4C disposed at the right side, and a fourth holding member 4D disposed at the left side. The holding members 4A, 4B, 4C, 4D have a nearly Z-form sectional shape, and the protecting panel 1 is held and defined in position by the L-form portion 5 of the holding portion 4y in the second half region. The depth d of the Z-form is shorter than the thickness t of the protecting panel by about 0.1 mm to 0.5 mm. Therefore, when the holding member 4 is placed, the protecting panel 1 is in a state slightly pressed to the screen 9 side.

The shape of the pressing portion 4x in the first half region of the holding member 4 has a wedge shape becoming thinner in thickness toward the leading end, and includes a taper portion 7 of slope or taper of, for example, 10 degrees or less, and when the pressing portion 4x having the wedge shape is inserted into the gap 8 between the screen 9 and the frame 2, it exhibits a wedge effect to prevent slipping of the holding member 4, while it is easy to insert the holding member.

The holding members 4A, 4B, 4C, 4D are preferred to be composed of an elastically deformable member, such as resin member or rubber member (silicone rubber, butyl rubber, fluororubber, natural rubber, etc.), and these holding members are manufactured by extrusion molding or injection molding, for example. By using the elastically deformable holding member 4, the L-form portion 5 is deformed and warped when mounting or dismounting the protecting panel 1 as described below, so that the work is easier. The pressing portion 4x is pressed in a compressed state in the gap between the flame 2 and the screen 9. By this constitution, the protection panel 1 is strongly fixed by the frame 2 and the screen 9.

The holding member 4 may be made of same material as the frame 2, and, for example, PS resin, ABS resin, PP resin, or acrylic resin may be used.

Preferably, the holding member 4 is made of a light permeable material, or a material of a same color as the frame 2, and the user (typically) hardly notices the presence of the holding member 4, and the appearance and design are not spoiled. By using a light permeable material, the range of the effective screen is not decreased, so that the frame 2 appears to be slim.

The mounting positions of the holding member 4 are not limited to four peripheral positions, but, in consideration of the rigidity of the protecting panel 1, when the protective panel 1 having a strong rigidity is used, the holding member 4 may be placed at only two positions in the upper and lower parts of the protecting panel.

An exemplary mounting method of the protecting panel 1 is described below. The screen 9 is placed at the back side of the frame 2 forming the opening, by means of the bracket 11. The bracket 11 is fixed to the frame 2 while pressing the screen 9. At this time, the gap 8 is formed between the frame 2 and the lower part of the front side of the screen 9. In the gap 8, the pressing portion 4x in the first half region of the nearly Z-form first holding member 4A is lightly pressed into the gap 8. By the pressing force between the frame 2 and screen 9 at this time, the first holding member 4A is held in the frame 2.

Next, along the opening of the frame 2, the lower part of the protecting panel 1 is inserted into the L-form part 5 of the holding portion of the first holding member 4A. The protecting panel 1 is received and held on the first holding member 4A. Then, the pressing portion 4x of the first half region of the second holding member 4B is lightly pressed into the gap 8 between the frame 2 and the upper part of the screen 9. By the pressing force between the frame 2 and screen 9 at this time, the second holding member 4B is held in the frame 2.

At the same time, the upper part of the protecting panel 1 is pressed to the screen 9 side by the pressing portion 4y of the second holding member 4B, and the protecting panel 1 is held on the screen 9 by this pressing force. If necessary, moreover, the third holding member 4C and fourth holding member 4D are lightly pressed into the gaps between the frame 2 and both sides of the screen 9 respectively, and the both sides of the protecting panel 1 may be pressed and held. Thus, the protecting panel 1 is held on the frame 2. Another exemplary method of mounting is described below. In the gap 8 between the frame 2 and the lower part of the screen 9, the pressing portion 4x of the first half region of the first holding member 4A is pressed, and in the gap 8 between the frame 2 and the upper part of the screen 9, the pressing portion 4x of the first half region of the second holding member 4B is pressed. Thus, by the pressing force between the frame 2 and the screen 9, the first holding member 4A and second holding member 4B are held on the frame 2.

Next, the protecting panel 1 is inserted by deflecting in an arc form, along the opening of the frame 2, between the holding portion 4y of the second half region of the first holding member 4A and the holding portion 4y of the second half region of the second holding member 4B. Then the protecting panel 1 in arc form is returned to the initial shape.

Thus, the lower part of the protecting panel 1 is held by the holding portion 4y of the first holding member 4A, and the upper part of the protecting panel 1 is held by the holding portion 4y of the second holding member 4B. If desired, moreover, the third holding member 4C and fourth holding member 4D are lightly pressed into the gaps between the frame 2 and both sides of the screen 9 respectively, and the both sides of the protecting panel 1 may be pressed and held. Thus, the protecting panel 1 is held on the frame 2.

In the exemplary embodiment, when the effective screen size of the television receiver 12 was 51 inches (1036 mm ×778 mm), the length K of the panel to stopping portion of the second half region 4y of the holding member 4 was about 8 mm, and the decrease rate of the effective screen was about 0.1%.

Incidentally, the color of the holding member may be different from the color of the frame 2. The surface of the holding member may have an undulated pattern. The shape of the holding member 4 is not limited to the Z-form section, and the pressing portion 4x of the first half region may be pressed in between the frame 2 and screen 9, and the holding portion 4y of the second half region may be in such a shape as to press the front side of the protecting panel 1.

The image device is described as having a frame. This frame which the image device has may be an integral part of the image device. Alternatively, this frame which the image device has may be an auxiliary frame which is coupled (directly or indirectly) to a further frame which is an integral part of the image device.

In such constitution, the holding member can be easily inserted between the frame and the screen, and at the same time the protecting panel can be easily placed at the front side of the screen. As a result, mounting of the protecting panel is easy. Moreover, the protecting panel can be easily dismounted from the front side of the screen. As a result, dismounting of the protecting panel is easy. Further, the protecting panel can be composed without spoiling the appearance. Still more, after dismounting the protecting panel, the original appearance can be restored.

What is claimed is:

1. A mounting structure for protecting a screen of an image device, comprising:

(a) a frame forming an opening, (b) said screen coupled to said frame and a top portion and a bottom portion of said screen spaced away from said frame and forming gaps therebetween, said gap between the top portion of said screen and said frame being substantially of the same dimension as said gap between the bottom portion of said screen and said frame, (c) a protecting panel disposed at the front side of said screen, and (d) holding members each including
        1) a holding portion for holding a peripheral edge of said protecting panel, and
        2) a pressing portion situated in one of said gaps formed between said frame and said screen.

2. A mounting structure according to claim 1, wherein said holding member is held on said frame by said pressing portion of said holding member, and said protecting panel is held on said frame by said holding portion of said holding member.

3. A mounting structure according to claim 2, wherein said screen is disposed at the back side of said frame, said protecting panel is disposed at the inner side of said opening of said frame, and a part of said holding portion of said holding member is positioned between said opening of said frame and the peripheral part of said protecting panel.

4. A mounting structure according to claim 1, wherein said protecting panel is substantially square, and said holding member is disposed on at least two sides of said protecting panel.

5. A mounting structure according to claim 1, wherein said holding member has a substantially Z-form sectional shape, one substantially L-form portion of said substantially Z-form is said holding portion, and a nearly linear portion of other nearly L-form portion of said nearly Z-form is said pressing portion.

6. A mounting structure according to claim 1, wherein said pressing portion has a wedge shape having a thinner thickness toward an end thereof, and said screen and said holding member are held on said frame by a pressing force of said wedge-shaped pressing portion.

7. A mounting structure according to claim 1, wherein said holding member is comprised of an elastically deformable member, and said pressing portion is situated in a compressed state in said gap between said frame and said screen.

8. A mounting structure according to claim 1, wherein said holding member is comprised of at least one of a resin member and a rubber member.

9. A mounting structure according to claim 1, wherein said holding member and said frame are comprised of the same material.

10. A mounting structure according to claim 1, wherein said holding member and said frame have the same color.

11. A mounting structure according to claim 1, wherein said holding member is comprised of a light permeable material.

12. A mounting structure according to claim 1, wherein said image device is a projection type television receiver.

13. A mounting structure of claim 1, wherein said frame is part of said image device.

14. A method of mounting a protecting panel on an image device which includes a screen, comprising the steps of:
(a) pressing a first pressing portion of a first holding member into a first gap formed between said frame and the front side of a lower part of said screen,
(b) fitting the lower part of a protecting panel on a first holding portion of said first holding member, and
(c) pressing a second pressing portion of a second holding member into a second gap formed between said frame and the front of an upper part of said screen, and fitting the upper part of said protecting panel to a second holding portion of said second holding member, said first gap and said second gap being of substantially the same dimension.

15. A method of mounting a protecting panel on an image device of claim 13, wherein said screen is placed at the back side of said frame, said protecting panel is placed at the inner side of said opening of said frame, a part of said first holding portion and a part of said second holding portion are positioned between said opening of said frame and the peripheral part of said protecting panel, said screen is held on said frame by at least one of a) a pressing force of said first pressing portion of said first holding member and b) a pressing force of said second pressing portion of said second holding member, and said protecting panel is held on said frame by said first holding portion of said first holding member and said second holding portion of said second holding member.

16. A method of mounting a protecting panel on an image device of claim 14, further comprising the steps of:
(e) pressing a third pressing portion of a third holding member into a third gap formed between said frame and the front side of a side part of said screen, and fitting the side part of said protecting panel to a third holding portion of said third holding member, and
(f) pressing a fourth pressing portion of a fourth holding member into a fourth gap formed between said frame and the front side of other side part of said screen, and fitting the side part of said protecting panel to a fourth holding portion of said fourth holding member.

17. A method of mounting a protecting panel on an image device of claim 14, wherein said first holding member has a substantially Z-form sectional shape, one substantially L-form portion of said substantially Z-form is said first holding portion, and a substantially linear portion of other substantially L-form portion of said substantially Z-form is said first pressing portion.

18. A method of mounting a protecting panel on an image device of claim 14, wherein said first pressing portion has a wedge shape having a thinner thickness toward an end thereof, and said screen and said holding member are held on said frame by pressing force of said wedge-shaped first pressing portion.

19. A method of mounting a protecting panel on an image device of claim 17, wherein said first pressing portion has a wedge shape having a thinner thickness toward an end thereof, and said screen and said holding member are held on said frame by pressing force of said wedge-shaped first pressing portion.

20. A method of mounting a protecting panel on an image device of claim 14, wherein said first holding member is comprised of an elastically deformable member, and said first pressing portion is pressed in a compressed state in said first gap between said frame and said screen.

21. A method of mounting a protecting panel on an image device of claim 17, wherein said first holding member is comprised of an elastically deformable member, and said first pressing portion is pressed in a compressed state in said first gap between said frame and said screen.

22. A method of mounting a protecting panel on an image device of claim 14, wherein said image device is a projection type television receiver.

23. A method of mounting a protecting panel on an image device which includes a frame having an opening and a screen, comprising the steps of:
(a) pressing a first pressing portion of a first holding member into a first gap formed between said frame and the front side of a lower part of said screen,
(b) pressing a second pressing portion of a second holding member into a second gap formed between said frame and the front side of an upper part of said screen, and
(c) placing a protecting panel while deflecting in all arc form between a first holding portion of said first holding member pressed into said first gap and a second holding portion of said second holding member pressed into said second gap, returning said protecting panel from said arc form to an original shape, holding the lower part of said protecting panel by said first holding portion of said first holding member, and holding the upper part of said protecting panel by said second holding portion of said second holding member, said first gap and said second gap being of substantially the same dimension.

24. A method of mounting a protecting panel on an image device of claim 23, wherein said screen is placed at the back side of said frame, said protecting panel is placed at the inner side of said opening of said frame, a part of said first holding portion and a part of said second holding portion are positioned between said opening of said frame and the peripheral part of said protecting panel, said screen is held on said frame by pressing force of said first pressing portion of said first holding member and said second pressing portion of said second holding member, and said protecting panel is held on said frame by said first holding portion of said first holding member and said second holding portion of said second holding member.

25. A method of mounting a protecting panel on an image device of claim 23, further comprising the steps of:
(d) pressing a third pressing portion of a third holding member into a third gap formed between said frame and the front side of a side part of said screen, and fitting the side part of said protecting panel to a third holding portion of said third holding member, and (e) pressing a fourth pressing portion of a fourth holding member into a fourth gap formed between said frame and the front side of other side part of said screen, and fitting the side part of said protecting panel to a fourth holding portion of said fourth holding member.

26. A method of mounting a protecting panel on an image device of claim 23, wherein said first holding member has a nearly Z-form sectional shape, one nearly L-form portion of said nearly Z-form is said first holding portion, and a nearly linear portion of other nearly L-form portion of said nearly Z-form is said first pressing portion.

27. A method of mounting a protecting panel on an image device of claim 23, wherein said first pressing portion has a wedge shape having a thinner thickness toward the end, and said screen and said holding member are held on said frame by pressing force of said wedge-shaped first pressing portion.

28. A method of mounting a protecting panel on an image device of claim 26, wherein said first pressing portion has a wedge shape having a thinner thickness toward the end, and said screen and said holding member are held on said frame by pressing force of said wedge-shaped first pressing portion.

29. A method of mounting a protecting panel on an image device of claim 23, wherein said first holding member is composed of an elastically deformable member, and said first pressing portion is pressed in a compressed state in said first gap between said frame and said screen.

30. A method of mounting a protecting panel on an image device of claim 26, wherein said first holding member is composed of an elastically deformable member, and said first pressing portion is pressed in a compressed state in said first gap between said frame and said screen.

31. A method of mounting a protecting panel on an image device of claim 23, wherein said image device is a projection type television receiver.

32. A mounting structure according to claim 5, wherein said pressing portion has a wedge shape having a thinner thickness toward an end thereof, and said screen and said holding member are held on said frame by a pressing force of said wedge-shaped pressing portion.

33. A mounting structure according to claim 5, wherein said holding member is comprised of an elastically deformable member, and said pressing portion is situated in a compressed state in said gap between said frame and said screen.

34. A mounting structure according to claim 5, wherein said holding member is comprised of at least one of a resin member and a rubber member.

35. A mounting structure according to claim 5, wherein said holding member and said frame are comprised of the same material.

36. A mounting structure according to claim 5, wherein said holding member and said frame have the same color.

37. A mounting structure according to claim 5, wherein said holding member is comprised of a light permeable material.

38. A mounting structure for protecting a screen of an image device having a frame forming an opening, and said screen coupled to said frame and a portion thereof spaced away from said frame and forming a gap, said mounting structure comprising:

a protecting panel disposed at the front side of said screen, said protecting panel having a height dimension less than a height dimension of the opening formed by said frame, and a holding member including 1) a holding portion for holding a peripheral edge of said protecting panel, and 2) a pressing portion situated in said gap formed between said frame and said screen.

39. A mounting structure for protecting a screen of an image device, comprising:

(a) a frame forming an opening, (b) said screen coupled to said frame and a top portion and a bottom portion of said screen spaced away from said frame and forming gaps therebetween, said gap between the top portion of said screen and said frame being of the same dimension as said gap between the bottom portion of said screen and said frame, (c) a protecting panel disposed at the front side of said screen, and (d) holding members each including 1) a holding portion for holding a peripheral edge of said protecting panel, and 2) a pressing portion situated in one of said gaps formed between said frame and said screen.

40. A method of mounting a protecting panel on an image device which includes a screen, comprising the steps of:

(a) pressing a first pressing portion of a first holding member into a first gap formed between said frame and the front side of a lower part of said screen, (b) fitting the lower part of a protecting panel on a first holding portion of said first holding member, and (c) pressing a second pressing portion of a second holding member into a second gap formed between said frame and the front of an upper part of said screen, and fitting the upper part of said protecting panel to a second holding portion of said second holding member, said first gap and said second gap being of the same dimension.

41. A method of mounting a protecting panel on an image device which includes a frame having an opening and a screen, comprising the steps of:

(a) pressing a first pressing portion of a first holding member into a first gap formed between said frame and the front side of a lower part of said screen, (b) pressing a second pressing portion of a second holding member into a second gap formed between said frame and the front side of an upper part of said screen, and (c) placing a protecting panel while deflecting in an arc form between a first holding portion of said first holding member pressed into said first gap and a second holding portion of said second holding member pressed into said second gap, returning said protecting panel from said arc form to an original shape, holding the lower part of said protecting panel by said first holding portion of said first holding member, and holding the upper part of said protecting panel by said second holding portion of said second holding member, said first gap and said second gap being of the same dimension.

* * * * *

UNITED STATES PATENT AND TRADEMARK OFFICE
CERTIFICATE OF CORRECTION

PATENT NO. : 6,137,548  
DATED : October 24, 2000  
INVENTOR(S) : Uchida et al.

Page 1 of 1

It is certified that error appears in the above-identified patent and that said Letters Patent is hereby corrected as shown below:

Column 8,
Line 38, "all" should read -- an --.

Signed and Sealed this

Thirtieth Day of October, 2001

Attest:

*Nicholas P. Godici*

NICHOLAS P. GODICI  
*Attesting Officer*  *Acting Director of the United States Patent and Trademark Office*